United States Patent Office 2,706,435
Patented Apr. 19, 1955

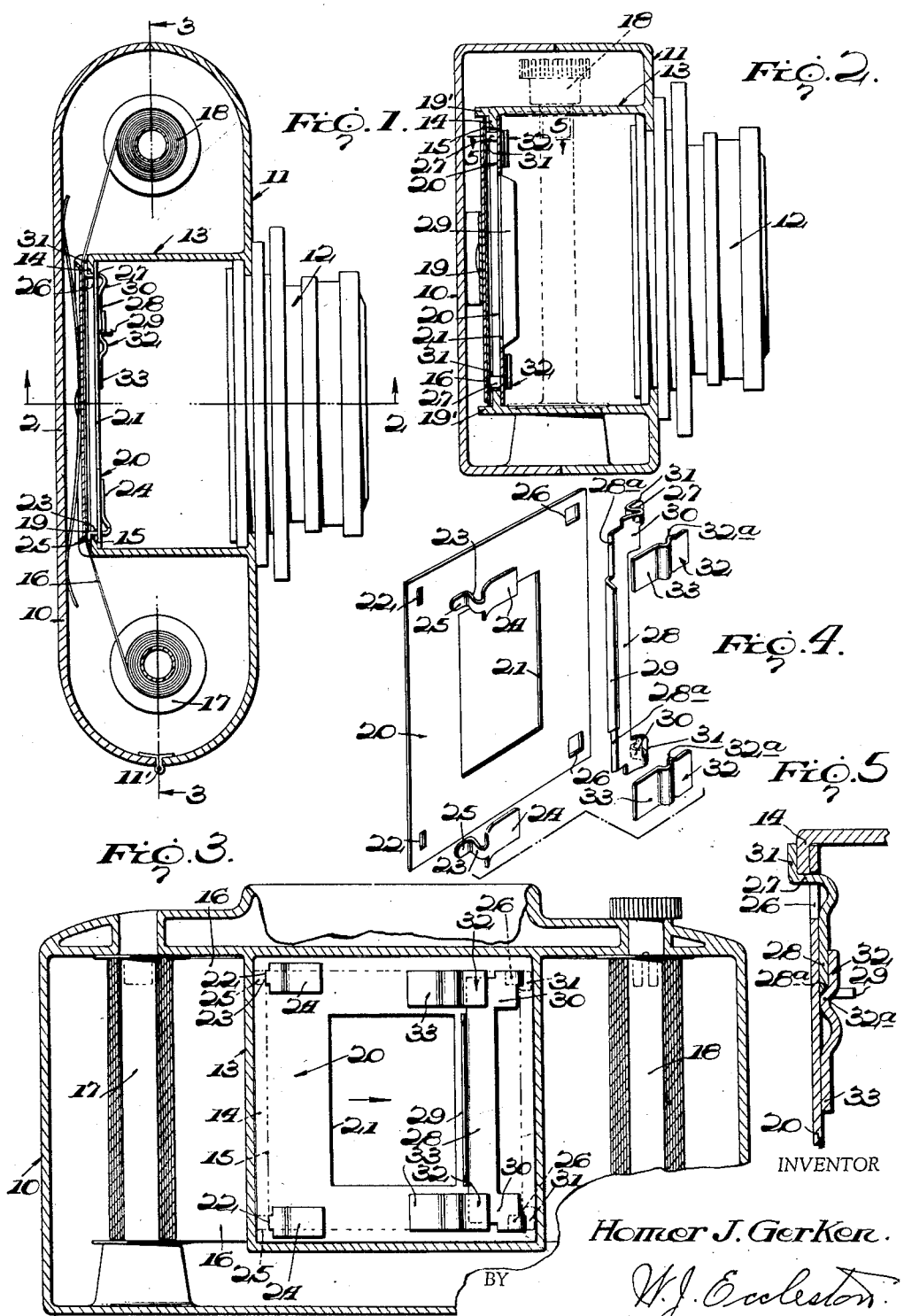

2,706,435

CAMERA MASK

Homer J. Gerken, United States Army, Fort Lee, Va.

Application January 21, 1953, Serial No. 332,579

5 Claims. (Cl. 95—36)

(Granted under Title 35, U. S. Code (1952), sec. 266)

The invention described herein, if patented, may be manufactured and used by or for the Government for governmental purposes, without the payment to me of any royalty thereon.

My invention relates to a mask for cameras.

An important object of the invention is to provide a camera mask to be arranged on the lens side of the focal plane opening of the camera, so as not to interfere with the spring-pressed plate on the back of the camera which engages the film and holds the same firmly against the focal plane opening.

A further object is to provide a mask which is readily attachable to a camera of the "candid" type, and requiring no alteration of the otherwise conventional camera structure.

A further object is to provide a camera mask which will permit the taking of a greater number of pictures or exposures on a given size of film, and thereby materially reducing the cost of pictures such as color transparencies and the like.

Another object is to provide a mask of the above-mentioned character which will provide a greater number of pictures for a given length of film, without necessitating the use of a narrower film, and therefore eliminating the need for special narrow adapter spools in the camera.

Still another object of the invention is to provide a camera mask which is highly simplified and inexpensive in construction, and which will not interfere with the normal operation of the film or damage the film in any way.

Other objects and advantages of the invention will be apparent during the course of the following description.

In the accompanying drawings forming a part of this application, and in which like numerals are employed to designate like parts throughout the same, Figure 1 is a central vertical longitudinal section through a camera equipped with the mask embodying the invention, Figure 2 is a horizontal section on line 2—2 of Figure 1, Figure 3 is a vertical section on line 3—3 of Figure 1, Figure 4 is an exploded perspective view of the mask removed, and, Figure 5 is an enlarged fragmentary horizontal section on line 5—5 of Figure 2.

In the drawings, where for the purpose of illustration is shown a preferred embodiment of the invention, the numeral 10 designates a rear casing section of a camera, which also includes a forward casing section 11, hinged to the rear casing section at 11'. The forward casing section 11 has mounted thereon a lens barrel 12 of conventional construction, and rearwardly of the lens barrel 12 is a light box or compartment 13, preferably formed integral with the casing section 11, as shown. The light box 13 has the rear wall or panel 14, spaced somewhat forwardly of the rear side of the casing section 10, and the rear wall 14 has formed therein the usual rectangular exposure or focal plane opening 15 for exposing a rectangular portion of the roll of film 16. The exposure opening 15 extends over the major portion of the rear wall 14, as shown.

The film 16 is wound upon the usual film spools 17 and 18, journaled within the opposite end portions of the camera casing, as shown. The usual spring-pressed plate 19 is carried by the rear casing section 10, and adapted to contact the film 16 and press the same firmly against the rear wall 14, which forms the film track of the camera, and has parallel guide flanges or ribs 19' formed thereon, Figure 2, between which the film 16 passes when moving over the rear wall 14. The construction thus far described is that of a conventional camera of the well-known "candid" type, which of itself forms no part of the present invention.

My mask comprises a flat rectangular body portion or plate 20 of relatively thin, stiff sheet metal or the like, and the size of the rectangular plate 20 is such that it may cover substantially the entire area of the rear wall 14 of the light box, which wall is also rectangular as shown in Figure 3. The plate 20 is provided with a central rectangular exposure aperture 21, of any preferred dimensions, but preferably of a size to expose an area of the film 16 equal to one-half of the area normally exposed by the camera opening 15.

The plate 20 is provided near two of its corners with a pair of narrow openings or slits 22, adapted to receive lateral arms 23 of stationary clips having body portions or tabs 24, which are soldered, welded, or otherwise permanently rigidly secured to the forward face of the plate 20. The lateral arms 23 extend through the slits 22 and beyond the rear surface of the plate 20 and are arranged substantially perpendicular thereto. At the rear ends, the arms 23 carry integral right angle extensions or feet 25 which are spaced rearwardly of the plate 20 and substantially parallel therewith. The feet 25 are spaced rearwardly of plate 20 a distance substantially equal to the thickness of the rear wall 14, and the free ends of the feet 20 may terminate substantially at the adjacent marginal edge of the rectangular plate 20, as best shown in Figure 3.

Near the other two corners of the plate 20, the same is provided with somewhat elongated rectangular openings 26, slidably receiving lateral arms 27 of an adjustable fastening element or clip, having an elongated flat body portion or strip 28, slidable upon the forward face of the plate 20. The body portion 28 has a narrow upturned longitudinal flange or handle 29 integrally formed thereon adjacent to the inner longitudinal edge thereof, and projecting forwardly of the clip body portion 28. The body portion 28 of the adjustable clip also has end transverse extensions or portions 30, integral therewith and upwardly inclined with respect to the front face of the plate 20 as shown in Figure 1. The lateral arms 27 are integrally secured to the end portions 30, as shown, and extend generally at right angles thereto and rearwardly thereof. As previously stated, the lateral arms 27 are received by the openings 26, and the arms 27 extend rearwardly of the plate 20 and have short integral right angle extensions or feet 31 secured to their rear ends, and spaced from the rear side of the plate 20 a distance substantially equal to the thickness of the rear wall 14, and substantially parallel to the plate 20. The adjustable clip is held against the plate 20 by a pair of spring keepers or leaves 32, having their inner ends 33 permanently rigidly secured to the forward face of the plate 20 by soldering, welding or the like. The leaves 32 are arranged near the top and bottom edges of the plate 20, above and below the exposure opening 21, and the free forward ends of the leaves overlap and frictionally bear against the transverse end portions 30 of the adjustable clip. The leaves 32 are formed to provide curved detents or shoulders 32a, near and inwardly of their forward ends, for engagement with the rear beveled edges 28a of body portion 28. When the adjustable clip is in the forwardmost position, Figure 5, the detents 32a engage the beveled edges 28a and lock the adjustable clip in engagement with the camera wall 14, the lateral arms 27 engaging the adjacent edge of the opening 15. When the adjustable clip is retracted, the beveled edges 28a slide under the detents 32a and elevate the spring leaves 32. This allows the clip extensions 30 to pass under the spring leaves 32, and permits disengagement of the feet 31 from the camera wall 14. The clip is bodily adjustable toward and from the adjacent marginal edge of the plate 20 an amount limited by the lengths of the openings 26, and the body portion 28 of the clip remains substantially parallel with the adjacent edges of the opening 21 and plate 20 in all adjusted positions.

In use, the mask is applied to the camera by merely opening or separating the casing sections 10 and 11 and inserting the plate 20 through the opening 15 to the forward side of the rear wall 14. This can readily be done by arranging the rectangular plate 20 diagonally between opposite corners of the rectangular opening 15 and then passing the same bodily through the opening 15 to the interior of the light box or compartment 13.

The rear side of the plate 20 remote from the leaves 32 and tabs 24 is arranged next to the rear wall 14, and the feet 25 of the stationary clips are engaged over the rear surface of the wall 14, adjacent to one side of the rectangular opening 15, Figure 1. The adjustable clip is now shifted inwardly to the fullest possible extent by means of the handle extension 29, and the feet 31 of the adjustable clip are engaged rearwardly of the wall 14 at the opposite side of the opening 15, Figure 1. The adjustable clip now is shifted forwardly or outwardly toward the adjacent vertical edge of the opening 15, until the lateral arms 27 contact the edge of the opening 15 as shown in Figure 1. The spring keepers or leaves 32 now lock the adjustable clip in the position shown in Figure 5, and the arms 27 and 23 are now in engagement with the opposite vertical edges of the camera opening 15, and the plate 20 is held flat against the forward side of the wall 14. In such position, the plate 20 forming the mask will not move, and the smaller exposure aperture 21 is centered with respect to the larger opening 15 of the camera light box, Figure 3. The feet 25 and 31 are thin and smooth, and are disposed flat against the rear face of the wall 14, so as not to interfere with the passage of the film 16 over them. As shown in Figure 1, the film passes between the spring-pressed plate 19 and the feet 25 and 31, while being guided in its longitudinal movement between ribs or flanges 19'. Since the exposure opening 21 of the mask is preferably half as wide as the regular exposure opening 15, twice as many exposures or pictures can be made on the film 16 as would be possible without the use of the mask. I wish to emphasize that the mask in no way interferes with the free operation of the film 16 and spring-pressed plate 19, as the various parts of the mask forming projections or irregularities, such as the tabs 24 and leaves 32 are all arranged forwardly of the wall 14 and out of the way of the film 16. Hence, the film is not likely to be scratched or marred by any part of the camera mask, as the film travels over the rear face of the wall 14. The only parts of the mask which are arranged at the rear of the wall 14 are the small flat feet 25 and 31, over which the film smoothly slides, the feet being positioned close to the longitudinal edges of the film.

Obviously, the precise size of the exposure opening 21 of the mask may be varied, and the opening may be made somewhat larger or smaller than the opening shown in the drawing, for exposing a relatively larger or smaller area of the film 16 upon the taking of a picture.

If desired, a narrower film than the standard width film 16 shown in the drawings may be used in connection with mask, and if this is done special narrow adapter rollers are employed within the camera for winding and unwinding the narrow film. Such a film would have substantially the width of the opening 21 in the vertical direction, and the film would not overlap the top and bottom portions of the plate 20 like the film 16 as shown in Figure 3. My camera mask, as shown and described would in no way interfere with the use of a narrower film, if desired.

The mask is very easy to apply to and remove from the camera, and necessitates no structural alteration of the camera. The use of the mask will effect considerable saving of money by facilitating a greater number of exposures on a given size of film, such as color transparencies, and the like, which are quite expensive.

I also desire to point out that my mask is not restricted in use to the particular camera shown in the drawing, for the purpose of illustration, but may readily be applied to any camera having a sufficiently large exposure opening and light box to permit the passage of the mask through the exposure opening, to the lens side of the wall 14.

It is to be understood that the form of the invention herewith shown and described is to be taken as a preferred example of the same, and that various changes in the shape, size and arrangement of parts may be resorted to, without departing from the spirit of the invention or scope of the subjoined claims.

Having thus described my invention, I claim:

1. In a camera having a lens assembly, a wall spaced from the lens assembly and having a rear side over which film is adapted to slide with the sensitized surface of the film facing the lens assembly, said wall having a large exposure opening therein defining relatively narrow side flanges on the wall receiving the film, a substantially flat masking plate engaging the forward side of the wall nearest the lens assembly and remote from the side of the wall receiving the film and covering the exposure opening of the wall and having a reduced exposure opening formed therein for exposing reduced areas of the film, stationary gripping elements carried by the masking plate near a pair of corners of the same and projecting rearwardly of the masking plate and adapted to grip one of said narrow flanges of the wall adjacent one side of the exposure opening of the wall, and adjustable gripping elements carried by the masking plate near the other corners of the same and projecting rearwardly thereof and adapted to grip the other flange of the wall adjacent to the other side of said exposure opening of the wall.

2. A mask for a camera having a lens assembly and a wall spaced rearwardly of the lens assembly and provided with a rectangular exposure opening, the exposure opening forming narrow wall portions at opposite sides of the exposure opening, the rear side of the wall being adapted to have a film slide over the same, comprising a rectangular masking plate engaging the forward side of the wall and covering the exposure opening of the wall and having an exposure opening of reduced size formed therein for exposing reduced areas of the film, stationary substantially L-shaped gripping elements arranged near a pair of corners of the masking plate and secured thereto and projecting rearwardly of the masking plate and adapted to grip one of said wall flanges, adjustable substantially L-shaped gripping elements connected with the masking plate near the other corners of the same and projecting rearwardly thereof and adapted to grip the other wall flange, and resilient means connected with said adjustable gripping elements for releasably holding the same in gripping engagement with the last-named wall flange, whereby the masking plate is positively secured to the forward side of said wall and spaced bodily from the film passing over the rear side of said wall.

3. A mask for a camera having an internal wall spaced from the lens assembly of the camera, said wall having a rectangular exposure opening therein defining relatively narrow wall flanges upon opposite sides of the exposure opening, the rear sides of said flanges slidably receiving film passing through the camera, comprising a substantially flat rectangular masking plate abutting the forward side of the wall and spaced thereby from contact with the film, the masking plate covering the exposure opening of the wall and having a rectangular exposure opening of reduced size formed therein, substantially L-shaped gripping elements fixedly secured to the masking plate adjacent a pair of corners of the same and projecting rearwardly of the masking plate and having parts engageable over the rear side of one of said wall flanges, whereby such wall flange is gripped between the masking plate and said elements, substantially L-shaped gripping elements movably connected with the masking plate adjacent the other corners of the same and projecting rearwardly thereof and having parts engageable over the rear side of the other wall flange, whereby such flange is gripped between the last-named parts and masking plate, and resilient means connected with the last-named gripping elements and releasably holding the same in gripping engagement with the last-named wall flange.

4. A mask for a camera having a lens assembly and a wall spaced rearwardly of the lens assembly and provided with an exposure opening, the exposure opening forming narrow wall portions at opposite sides thereof, the rear sides of said narrow wall portions adapted to have a film slide over the same, comprising an opaque masking plate engaging the forward side of said wall and covering the exposure opening of the wall and having an exposure opening of reduced size for exposing reduced areas of the film, stationary substantially L-shaped spaced gripping elements secured to the masking plate near one end of the same and projecting rearwardly thereof and adapted to grip one of said narrow wall portions, the masking plate having a pair of spaced slots formed therein near the opposite end thereof transversely of the other narrow wall portion, adjustable substantially L-shaped gripping elements extending through said slots and moveable longitudinally of the slots and projecting rearwardly of the masking plate and adapted to grip said other narrow wall portion, a slide bar disposed upon the forward side of the masking plate between said adjustable gripping elements and secured thereto and operable to shift the adjustable gripping elements into and out of gripping engagement with said other narrow wall portion, and a resilient clip secured to the forward side of the masking plate and overlying the slide bar and frictionally contacting the same for realeasably holding the slide bar and adjustable gripping elements in selected adjusted positions.

5. The construction for a camera mask as set forth in claim 4, wherein a pair of resilient clips secured to the forward face of the masking plate overlap the slide bar and frictionally contact the same near the opposite ends of the slide bar.

References Cited in the file of this patent

UNITED STATES PATENTS

| | | |
|---|---|---|
| 1,552,127 | Ellingson | Sept. 1, 1925 |
| 1,556,868 | Murray | Oct. 13, 1925 |
| 2,210,988 | Shelton | Aug. 13, 1940 |